United States Patent [19]

Handeland

[11] 4,235,849

[45] Nov. 25, 1980

[54] CHEMICAL TABLET DISPENSING DEVICE FOR WELLS

[76] Inventor: George A. Handeland, Ringsted, Iowa 50578

[21] Appl. No.: 904,465

[22] Filed: May 10, 1978

[51] Int. Cl.[3] .............................................. B01D 11/02

[52] U.S. Cl. .................................... 422/263; 422/266; 166/75 R; 222/370

[58] Field of Search ............... 422/263, 264, 266, 271, 422/273; 166/75 R, 97, 51; 222/370; 210/62, 169, 97, 170, 198; 137/101.19, 499

[56] References Cited

U.S. PATENT DOCUMENTS

| | | | |
|---|---|---|---|
| 1,757,140 | 5/1930 | Pulkinghorn | 422/266 |
| 2,551,738 | 5/1951 | Harthorn | 422/263 |
| 2,981,335 | 4/1961 | Bucy | 166/75 |
| 3,079,051 | 2/1963 | Clark | 222/370 |
| 3,160,210 | 12/1964 | Brewer | 166/75 |
| 3,266,677 | 8/1966 | Hamilton | 222/370 |
| 3,301,442 | 1/1967 | Schwertfeger | 222/370 |
| 3,554,406 | 1/1971 | Kleysteuber | 222/370 |
| 3,710,867 | 1/1971 | Bansbach | 166/75 |
| 4,099,536 | 7/1978 | Dower | 137/499 |
| 4,129,230 | 12/1978 | Billett | 422/266 |

*Primary Examiner*—Hiram H. Bernstein

*Attorney, Agent, or Firm*—Zarley, McKee, Thomte, Voorhees & Sease

[57] ABSTRACT

A chemical pellet dispensing device for wells includes a housing defining a pellet chamber and having an inclined bottom wall. A pellet dispensing tube which opens through the bottom wall communicates with the well. A false bottom wall maintains the level of pellets within the chamber below the open end of the pellet dispensing tube. A pellet conveying member is movable along the bottom wall between a position below the level of pellets in the chamber for receiving a pellet to a position in registration with the pellet dispensing tube for depositing a pellet therein. The pellet conveying member is driven by a power source actuated in response to fluid flow from the well. A pellet dislodging slip clutch is interposed between the power source and pellet conveying member. A mechanism is provided for adjusting the rate at which pellets are dispensed into the well.

20 Claims, 19 Drawing Figures

CHEMICAL TABLET DISPENSING DEVICE FOR WELLS

BACKGROUND OF THE INVENTION

This invention is directed generally to pellet dispensing devices and more particularly to a device for dispensing chemical tablets into a well in response to water flow from the well.

Many homes are not connected to water supply lines but are connected to water wells including pump means for furnishing water under pressure to the home. It is frequently desirable or necessary to treat the well water to purify the same. For this purpose, there have been provided devices for periodically dispensing pellets of chlorine or the like into a well.

There are several problems associated with the use of presently known pellet dispensing devices. One problem is the difficulty of dispensing the correct dosage of pellets into the well. Devices which are electrically responsive to operation of the water pump in the well will dispense pellets into the well even if conditions are such that only air is being pumped. Similarly, water conditions within the well may change over time and may be effected by the frequency of use of the well so that the correct dosage for a given well may vary from time to time. Another common problem is the difficulty of dispensing pellets one by one due to the accumulation of pellets at the discharge opening of the device. Finally, the chemical tablets stored within the device may lose chemical gas at varying rates depending on the temperature within the pellet chamber.

There are also unresolved problems associated with the maintenance of the pellet dispensing devices. For example, if the device becomes inoperable due to a pellet lodged within the dispensing apparatus, the inoperative condition may go unnoticed until the next inspection or until it is detected that the water delivered to the house is not being purified. These problems are resolved by the chemical tablet dispensing device of the present invention.

SUMMARY OF THE INVENTION

The chemical tablet dispensing device of the present invention includes a pellet chamber having a bottom wall inclined relative to the well so that the pellet dispensing tube which opens through the bottom wall may be positioned above the level of pellets within the chamber. A rotatable pellet conveying member having openings of a size for receiving single pellets assures that the pellets are delivered one by one to the dispensing tube. A false wall within the chamber maintains the level of pellets at the bottom wall below the open end of the dispensing tube.

The control means which operates the motor for turning the pellet conveying member is responsive to water flow from the well to assure that the number of pellets dispensed into the well is a direct function of the time that water is actually being pumped from the well. Furthermore, the drive means between the motor and pellet conveying member is adjustable so that the rate at which pellets are dispensed into the well may be adjusted according to the degree of purification required for a particular well at a particular time. The drive means is also provided with a slip clutch mechanism operative to automatically dislodge a pellet which may obstruct movement of the pellet conveying member.

A thermostat control device is provided for regulating the temperature within the pellet chamber to maintain the pellets at the most stable temperature therefor. A presence detector switch on the interior sidewall of the pellet chamber is connected to an external indicator for signaling that the pellet supply needs to be replenished.

DESCRIPTION OF THE PREFERRED EMBODIMENT

Figure 1:
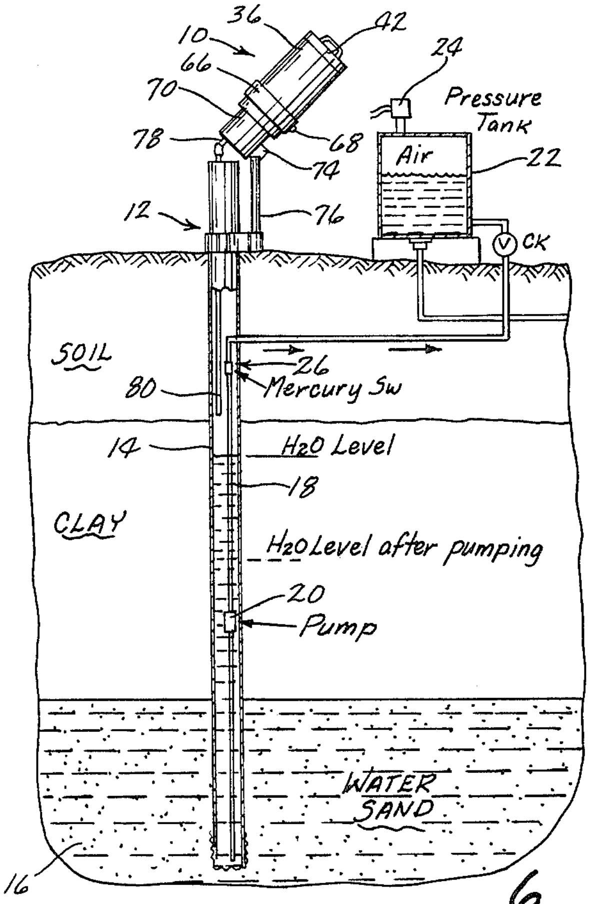
FIG. 1 is a partially sectional diagrammatic view of a well having the chemical pellet dispensing device of the present invention installed thereon.

The chemical tablet dispensing device of the present invention is indicated generally at 10 in FIG. 1 in assembly relation with a water well indicated generally at 12. The well 12 includes a vertical casing 14 extended into the ground to a depth at which its lower end is exposed to an underground source as at 16. A water pipe 18 within casing 14 has a conventional water pump means 20 associated with it for pumping water to a ground supported pressure tank 22. An electrical pressure switch 24 on tank 22 actuates the pump 20 to refill the tank whenever the pressure drops to a predetermined level. Accordingly, a continuous supply of water under pressure is maintained within the tank 22.

Figure 2:
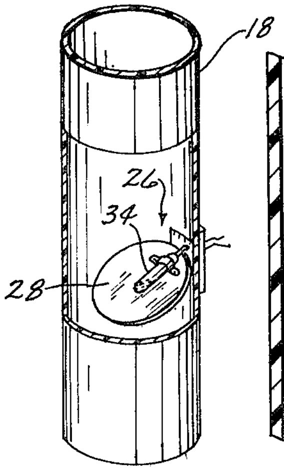
FIG. 2 is an enlarged detail perspective view of the flow responsive control means with a portion of the water pipe broken away for clarity.
Figure 3:
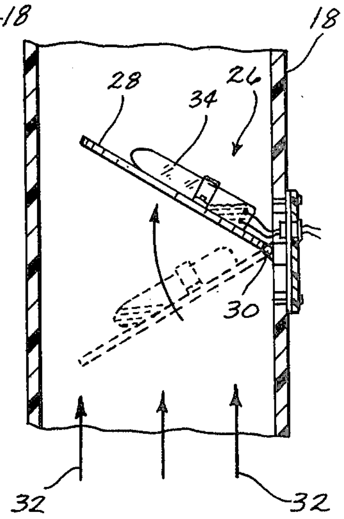
FIG. 3 is a further enlarged side view, partly in section, of the flow responsive control switch showing the changed positions therefor.

A flow responsive control switch 26 is installed within the water pipe 18 for actuating the pellet dispensing device 10 in response to water flow through the pipe 18. Referring to FIGS. 2 and 3, switch 26 includes a baffle disc 28 connected by a hinge 30 to the interior pipe sidewall for pivotal movement between the solid and dotted line positions indicated in FIG. 3. When the pump 20 is inactive, the baffle assumes the dotted line position due to gravity although a light spring could be utilized if the switch 26 was not installed on a vertical section of pipe. In response to water flow from the pump in the direction of arrows 32, the baffle is raised to the solid line position in FIG. 3. A mercury switch 34 is carried on the upstream side of the baffle 28 and is electrically connected to the pellet dispensing device 10 for actuating the same whenever water is flowing through the pipe 18.

Figure 4:
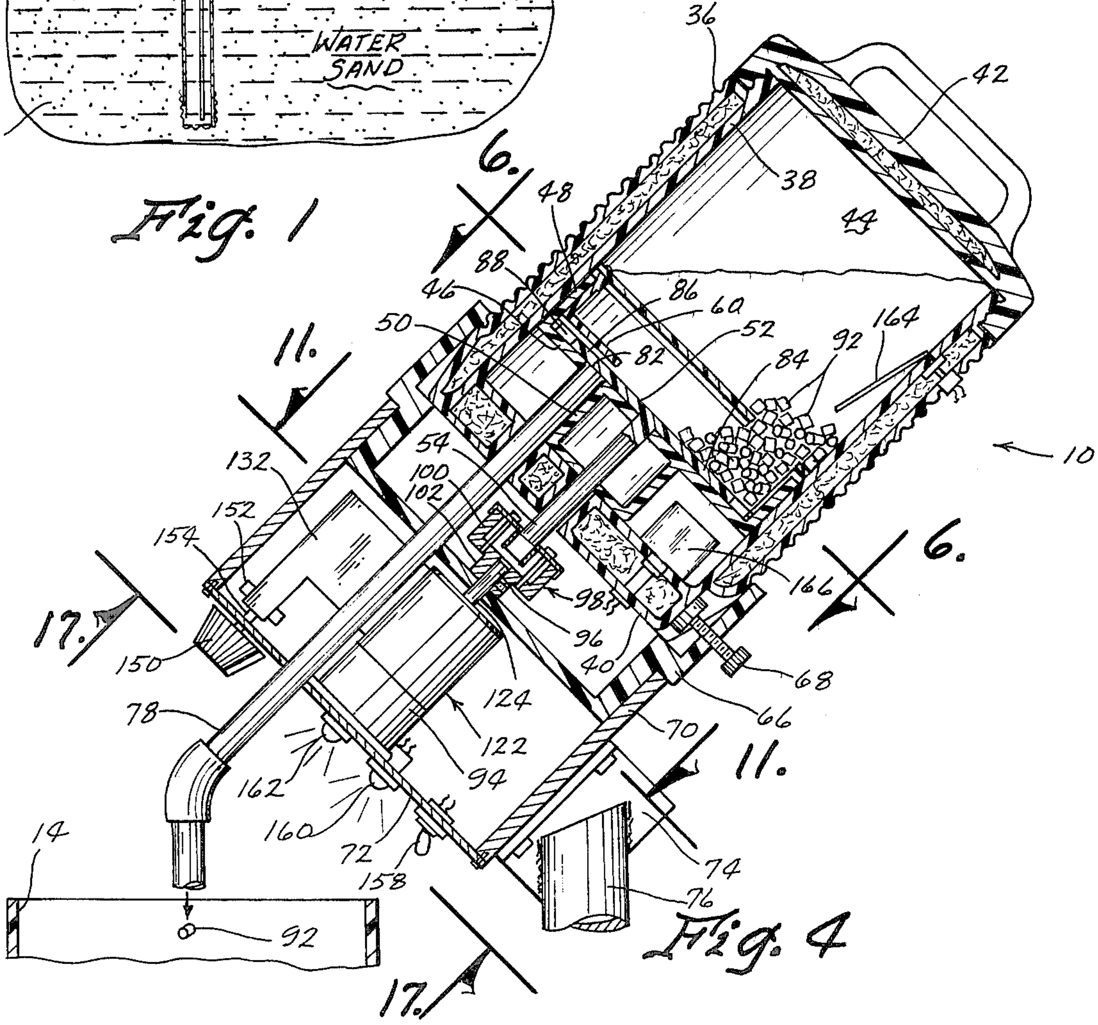
FIG. 4 is a side sectional view of the invention.
Figure 5:
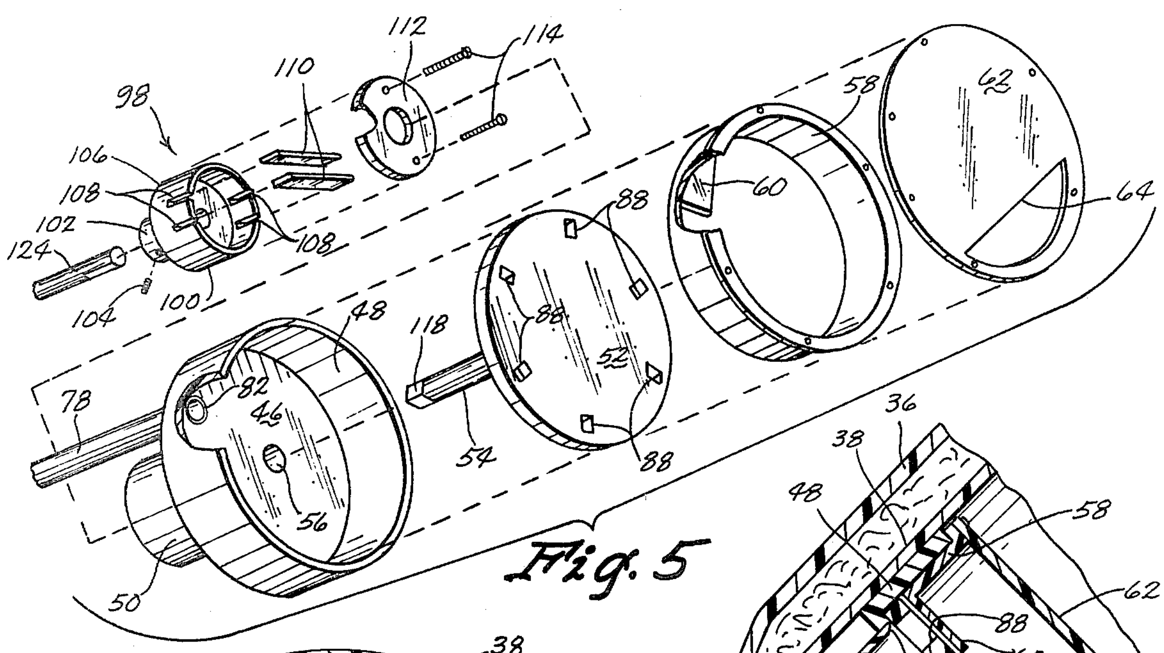
FIG. 5 is an exploded perspective view of the housing and pellet conveying disc assembly together with the dislodging slip clutch of the drive means therefor.

The pellet dispensing device 10 is shown in FIG. 4 as including a cylindrical housing 36 having a continuous insulated sidewall 38, an insulated base wall 40 and an insulated cover 42 which is removable for depositing pellets into the open upper end of the housing 36. A pellet chamber 44 within the housing 36 is defined by sidewall 38 and a bottom wall 46 (FIGS. 4 and 5). The bottom wall 46 includes an upwardly extended cylindrical rim 48 adapted to be fit within the housing sidewall 38 as shown in FIG. 4. A downwardly extended cylindrical portion 50 serves to space the bottom wall 46 from the housing base wall 40.

Rotatably supported on the bottom wall 46 is a pellet conveying disc 52 having a downwardly extended shaft 54 rotatably carried within a central opening 56 in the bottom wall 46. A sleeve 58 retains the pellet conveying disc at a position adjacent the bottom wall 46 and carries a radially inwardly extended closure flange or plate 60 for a purpose described hereinbelow. The upper end of sleeve 58 is closed by a false wall 62 having a wall opening 64 through a lower portion thereof. Accordingly, pellets inserted into the chamber 44 accumulate against the false wall 62 with only the lowermost pellets passing through the wall opening 64 toward the disc 52.

Referring again to FIG. 4, it is seen that the housing is retained within a cup-shape support member 66 by a set screw 68. Support member 66 is in turn, fit within a cylindrical shell 70 closed at the bottom by an instrument panel 72. A support bracket 74 on the sidewall of shell 70 secures the housing 36, support member 66 and shell 70 on the top of a pipe standard 76 at an inclination to the well casing 14 (FIGS. 1 and 4).

A pellet dispensing tube 78 has a lower end 80 in communication with the well casing 14. The tube 78 extends upwardly through the instrument panel 72, support member 66 and housing base wall 40 with its upper end 82 opening through the bottom wall 46. It is seen in FIG. 4 that the false bottom wall 62 and inclination of the housing 36 assure that the pellets engage only a lower portion 84 of the pellet conveying disc 52 whereas the dispensing tube 78 opens through an upper portion 86 of disc 52. Accordingly, the level of pellets within the chamber at the disc 52 is always below the open upper end 82 of the pellet dispensing tube 78.

Figure 6:
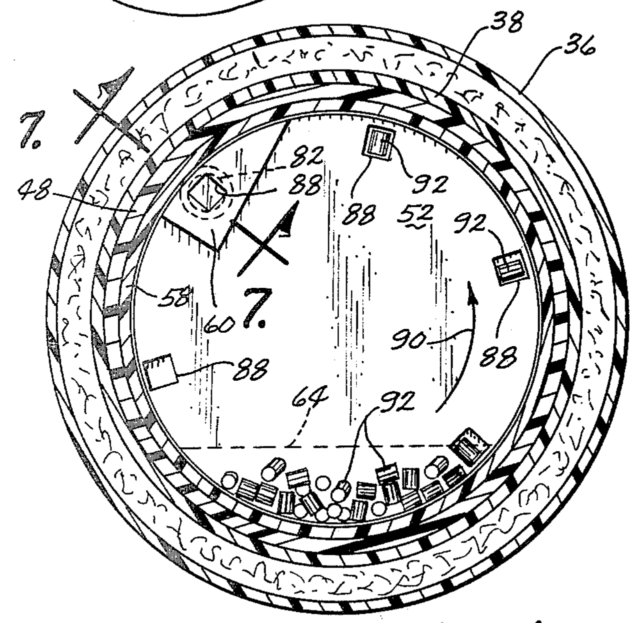
FIG. 6 is a top sectional view taken along line 6—6 in FIG. 4.

Referring to FIGS. 5 and 6, it is seen that disc 52 has a plurality of circumferentially spaced apart openings 88 adjacent the peripheral edge of the disc. These openings form pellet receiving pockets with the bottom wall 46 so that when the disc is rotated in a counterclockwise direction as indicated by arrow 90 in FIG. 6 each opening is moved from a first position below the level of pellets at the disc 52 up and around to a second position in registration with the open upper end of the dispensing tube 78. As an opening 88 is moved into registration with the tube 78, the pellet 92 is deposited into the tube 78 as shown in FIG. 7 for passage to the well casing 14.

Figure 7:
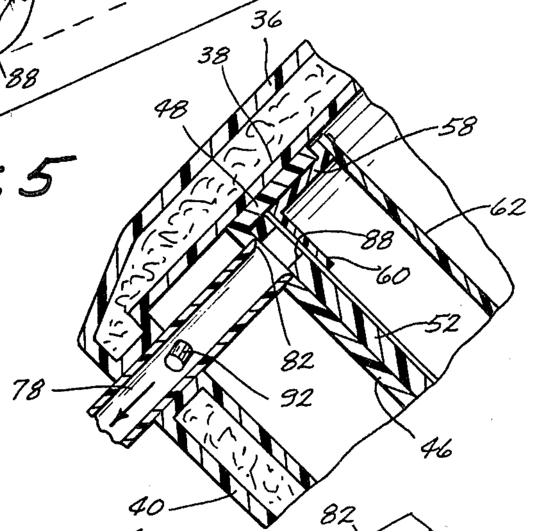
FIG. 7 is an enlarged detail sectional view, taken along line 7—7 in FIG. 6 and showing a pellet deposited into the dispensing tube.

Note that the open upper end of dispensing tube 78 is generally closed by the disc 52 except when one of the openings 88 registers with the tube as shown in FIG. 7. At this position of the disc, it will be seen that the registered opening 88 is interposed between the bottom wall 46 and closure plate 60 so that the tube remains closed at all times. This is helpful for sealing in the highly corrosive chlorine gas within the chamber 44 and sealing out atmospheric moisture. Closure plate 60 also prevents inadvertent passage of a pellet into the tube 78 except when delivered to the tube through one of the disc openings 88.

Referring again to FIG. 4, it is seen that the pellet conveying disc 52 is rotated by an electric motor 94 which rotates a drive shaft 96 which is secured to the lower end of the disc shaft 54 by a dislodging slip clutch indicated generally at 98.

In the exploded view of FIG. 5, it is seen that the slip clutch 98 includes a casting 100 having a small cylindrical portion 102 locked onto the drive shaft 96 by a set screw 104. An upper and larger cylindrical portion 106 has two pair of spaced apart longitudinal slots 108 for receiving a pair of transversely extended spring plates 110 which are retained within the slots by a cover 112 secured by screws 114. It can further be seen in FIG. 5 that the lower end of disc shaft 54 is formed with flat faces as at 118 adapted for insertion between the spring plates 110 for rotating disc 52.

Figure 9:
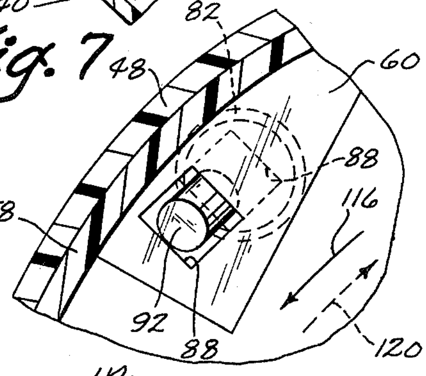
FIG. 9 is a detail top view of a pellet lodged between the pellet conveying disc and dispensing tube opening.
Figure 8:
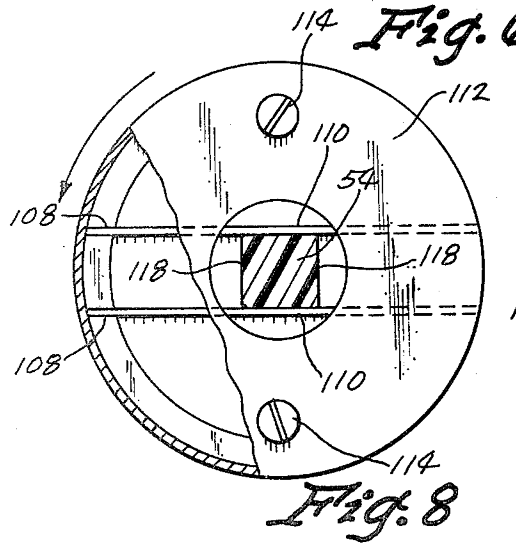
FIG. 8 is a top view of the dislodging slip clutch assembly, with parts broken away for clarity.
Figure 10:
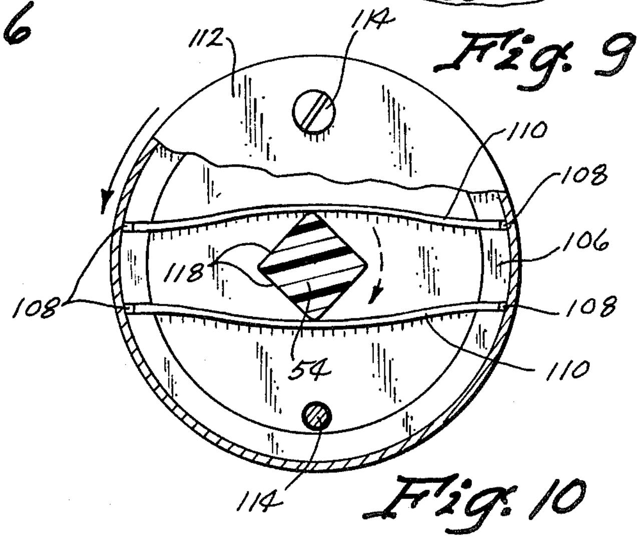
FIG. 10 is a top view of the dislodging slip clutch assembly showing the conveying disc shaft being reversely rotated to dislodge the pellet in FIG. 9.

In the event that a pellet becomes lodged between one of the disc openings 88 and the open end of tube 78 as shown in FIG. 9, counterclockwise rotation of the disc 52 is hampered. Slip clutch 98 will nevertheless continue to rotate with the drive shaft 96 with the result that the stationary disc shaft tends to spread apart the spring plates 110 as indicated in FIG. 10. Once the clutch rotates 45° beyond the stationary disc shaft 54, it can be seen that the tendency of the spring plates to come together forces the disc shaft 54 to rotate in a reverse or clockwise direction as indicated by arrow 120 in FIG. 10. Accordingly, the disc 52 is moved in the direction of arrow 121 in FIG. 9 so as to re-register opening 88 with the tube 78 for dislodging the pellet and depositing it into the tube. The disc 52 is then free to continue rotation in a clockwise direction of arrow 116 with the slip clutch 98 engaging the disc shaft 54 in the manner shown in FIG. 8.

Figure 11:
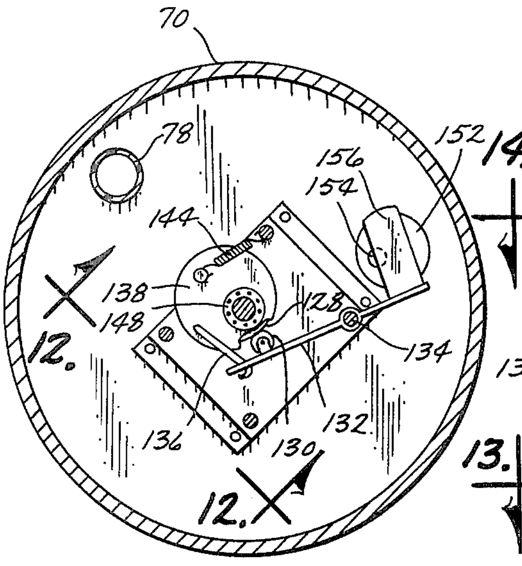
FIG. 11 is a sectional view taken along line 11—11 in FIG. 4.
Figure 12:
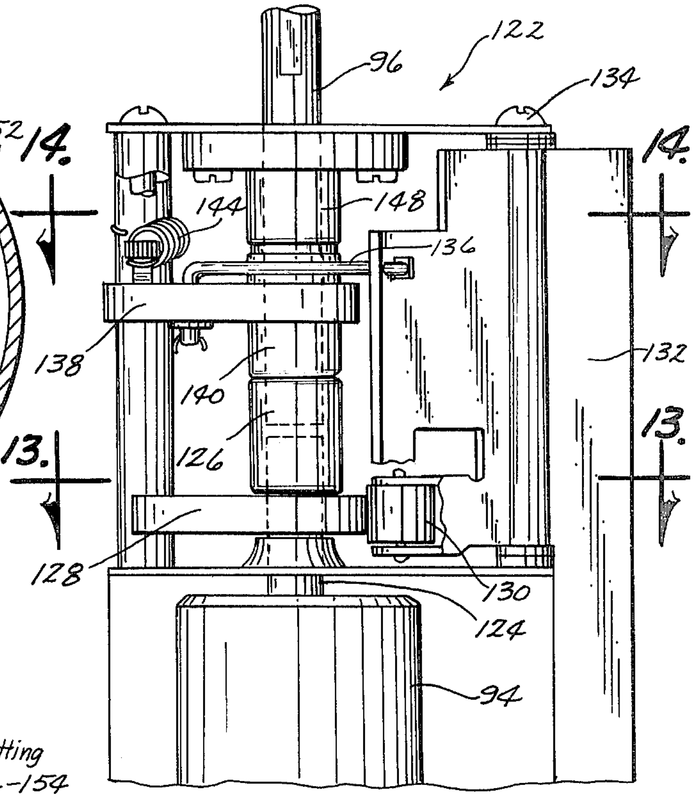
FIG. 12 is a side sectional view taken along line 12—12 in FIG. 11.
Figure 14:
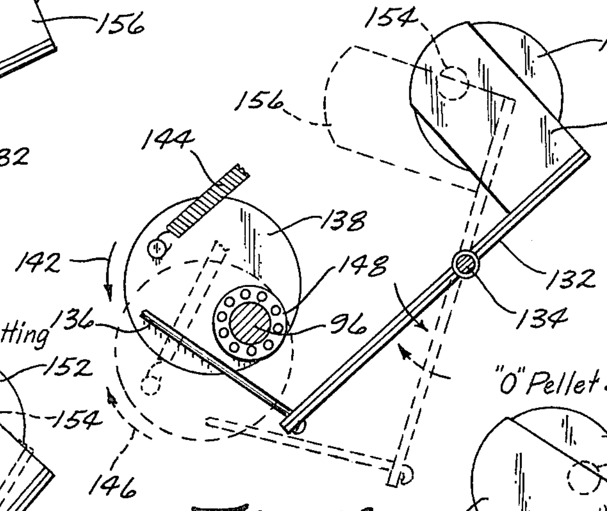
FIG. 14 is a sectional view of the drive mechanism of the invention taken along line 14—14 in FIG. 12.

It can be seen in FIGS. 11 and 12 that the motor 94 is operatively connected to the drive shaft 96 by a drive mechanism, indicated generally at 122. The motor is installed with its output shaft 124 received within one end of a sleeve bearing 126 with an eccentric cam 128 fixed on the output shaft between the motor and sleeve bearing. The drive shaft 96 is rotatably received within the other end of the sleeve bearing 126. Eccentric cam 128 engages a roller 130 carried on a pivot arm 132 which is pivotally supported on a supporting bolt 134. A rod 136 connects the pivot arm to a lever arm 138 which is fixed on a one-way bearing 140 on drive shaft 96. Referring to FIG. 14, it is seen that the drive shaft 96 is rotated only in response to counterclockwise rotation of lever arm 138 in the direction of arrow 142. A spring 144 biases lever arm 138 toward rotation in the clockwise direction of dotted arrow 146. Referring to FIG. 12, another one-way clutch 148 is secured onto the drive shaft 96 by a face plate 150 to permit rotation of the drive shaft in only the counterclockwise direction of arrow 142 in FIG. 14.

Figure 13:
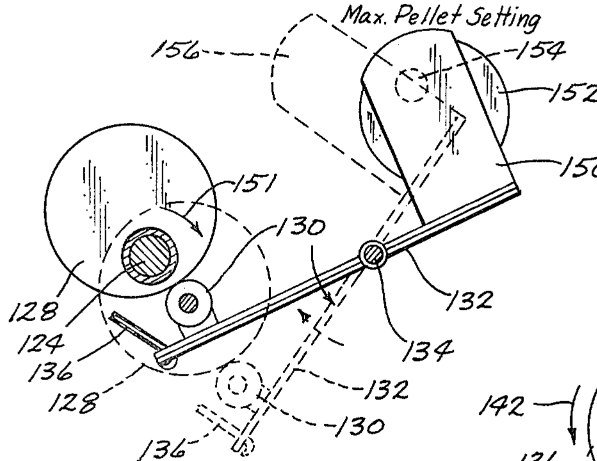
FIG. 13 is a sectional view taken along line 13—13 in FIG. 12 showing the changed positions of the drive mechanism at the maximum pellet setting.

In operation, activation of motor 94 through one revolution rotates eccentric cam 128 from the solid line position to the dotted line position in FIG. 13 in the direction of arrow 150. Accordingly, pivot arm 132 is likewise moved to the dotted line position therefor in FIG. 14 whereupon lever arm 138 is rotated counterclockwise by rod 136 to rotate the drive shaft 96 through a selected angle. Continued rotation of eccentric cam 128 permits the pivot arm 132 and lever arm 138 to be pivoted in the opposite direction by the action of spring 144 back to the solid line positions of FIGS. 13 and 14.

Figure 15:
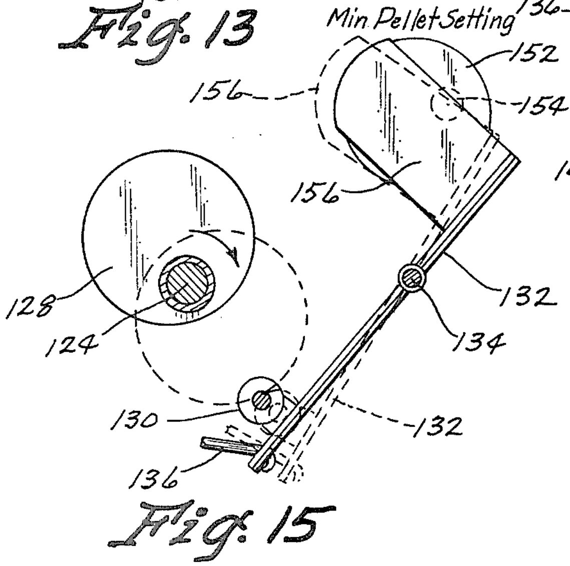
FIG. 15 is a sectional view similar to FIG. 13 showing the changed positions of the drive mechanism at a minimum pellet setting.
Figure 16:
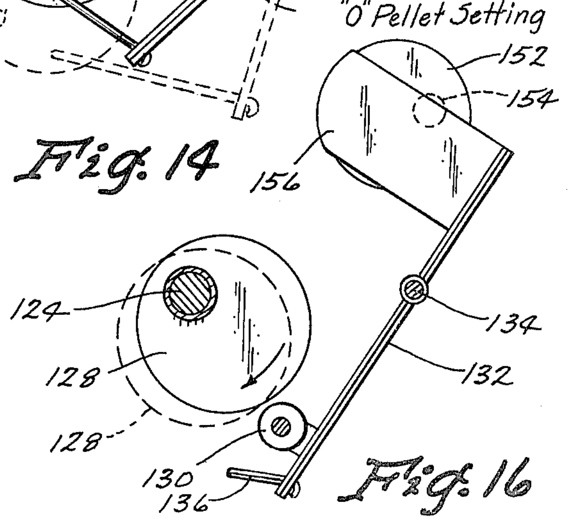
FIG. 16 is a sectional view similar to FIGS. 13 and 15 showing the drive mechanism at a "0" pellet setting.
Figure 17:
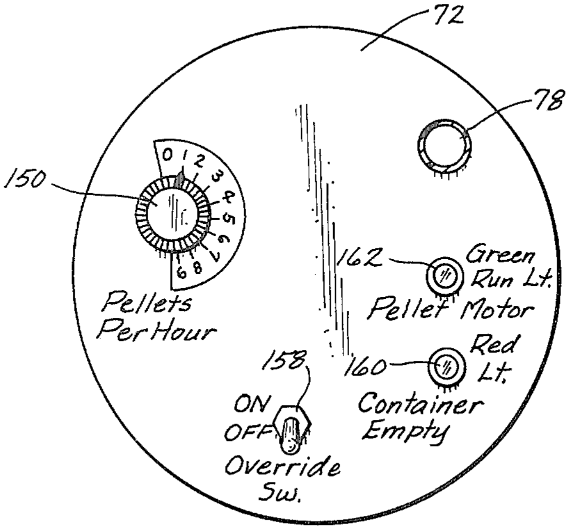
FIG. 17 is a bottom sectional view taken along line 17—17 in FIG. 4.

On the instrument panel in FIG. 17, there is shown a dial 150 for selecting the number of pellets to be dispensed per hour of water flow from the well. In FIG. 4 it is seen that dial 150 carries a cam 152 on the dial shaft 154, both of which are also shown in FIGS. 13–16. It can be seen in these figures that cam 152 is associated with pivot arm 132 by a bracket 156 for limiting pivotal return movement of the pivot arm 132 by the urging of spring 144. In the maximum pellet setting for the dial 150 as shown in FIG. 13, the cam 152 provides only minimal interference with the pivotal movement of pivot arm 132. In FIG. 15, on the other hand, dial 150 is set to a minimum pellet setting wherein cam 152 permits only very limited return movement of the pivot arm 132 from the dotted line to solid line positions therefor with the result that roller 130 of pivot arm 132 is engaged against the eccentric cam 128 for only a brief portion of each revolution of cam 128. Finally, in the "0" pellet setting shown in FIG. 16, it is seen that cam 152 retains pivot arm 132 in a position with roller 130 disengaged from eccentric cam 128 at all times. At the "0" pellet setting, the drive shaft will remain stationary when the motor output shaft 124 is rotated.

Displayed with dial 150 on the instrument panel 72 in FIG. 17, there is shown an on-off override switch 158, a red light for signaling that the level of pellets in chamber 44 has dropped below a predetermine level and a green light 162 which is illuminated whenever the motor 94 is running. Referring to FIG. 4, it is seen that a pellet switch 164 is secured onto the housing sidewall 38. Normally, this switch in opened by the weight of pellets against the switch arm. However, with the pellet supply depleted as in FIG. 4, the switch arm pivots upwardly by spring force to close the pellet switch 164 and illuminate the red light 160 on the instrument panel. Also shown in FIG. 4 is the thermostat control heating or cooling unit 166 installed on the base wall 40 of housing 36 for regulating the temperature within the pellet chamber 44.

Figure 18:
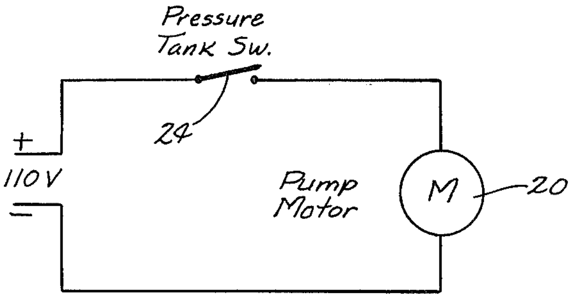
FIG. 18 is a schematic circuit diagram for the well.

FIG. 18 is a schematic circuit diagram for the water well 12. The pump motor 20 and tank pressure switch 24 are shown connected in series with a source of electric power. Thus, the pump motor 20 is energized whenever the pressure switch 24 is closed.

Figure 19:
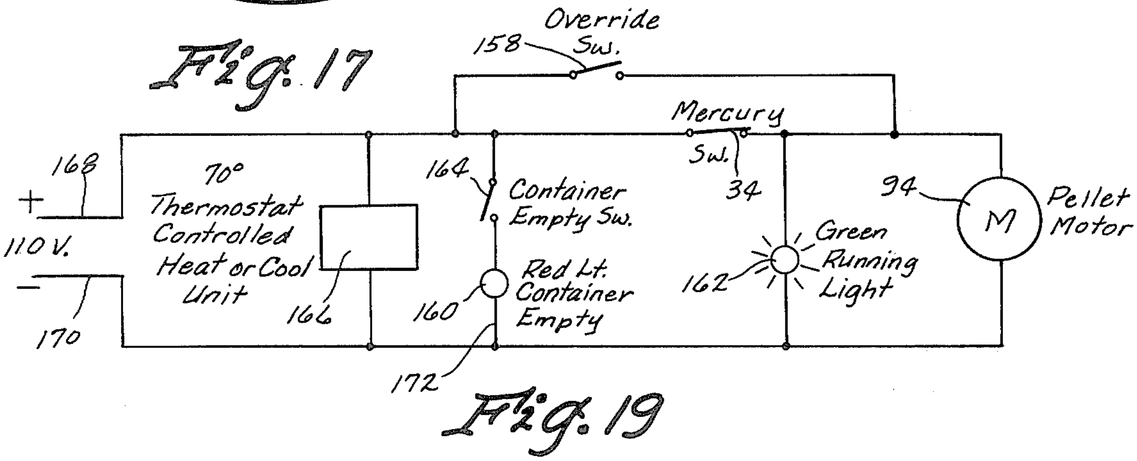
FIG. 19 is a schematic diagram for the invention.

FIG. 19 shows a schematic circuit diagram for the pellet dispensing device of the invention. Connected in parallel between a pair of electrical leads 168 and 170 are the unit 166 and a line 172 on which the pellet switch 164 and red light 160 are connected in series. The green light 162 and motor 94 are connected in parallel between line 170 and the flow responsive mercury switch 34. Override switch 168 is connected in parallel to mercury switch 34 for operating the motor 94 manually.

Thus there has been shown and described a chemical pellet dispensing device wherein the dosage of pellets to be dispensed per volume of water removed from the well may be adjusted to a selected setting by a dial on the instrument panel of the device. The slip clutch in the drive mechanism affords automatic dislodging of pellets which would otherwise incapacitate the device. The hinged baffle switch provides positive control of the device in direct response to the flow of water from the well. Finally, the inclination of the housing relative to the well enables the dispensing tube to be situated above the level of pellets within the chamber for positive delivery of pellets one by one to the dispensing tube.

I claim:

1. A pellet storage and dispensing apparatus comprising,
   - a housing having a sidewall and bottom wall defining a pellet chamber,
   - means for supporting said housing at an incline whereby said bottom wall has upper and lower portions,
   - a pellet dispensing tube having one end operatively connected to said bottom wall so as to open through said upper portion,
   - means for maintaining the level of pellets within said chamber below said one end of the pellet dispensing tube,
   - a pellet conveying member movably supported within said pellet chamber adjacent the bottom wall, said member having at least one opening which partially defines a pellet receiving pocket,
   - said pellet conveying member being movable between a first position wherein said opening is disposed below said one end of the pellet dispensing tube for receiving a pellet from said chamber and a second position wherein said opening is registered with said one end of the pellet dispensing tube for delivering a pellet into said tube,
   - a power source,
   - drive means interconnecting said power source and said pellet conveying member for movement of said member in response to actuation of said power source, and
   - control means for actuating said power source.

2. The apparatus according to claim 1 wherein said means for maintaining the level of pellets within said chamber comprises a false bottom wall supported in spaced relation from said bottom wall, said false bottom wall having a wall opening for the passage of pellets therethrough, the top of said wall opening being disposed below the upper end of the pellet dispensing tube.

3. The apparatus of claim 1 wherein said pellet conveying member comprises a disc rotatably supported on said bottom wall and having a plurality of circumferentially spaced apart pellet receiving openings adjacent the peripheral edge of said disc.

4. The apparatus of claim 3 wherein said disc engages the bottom wall around said upper end of the pellet dispensing tube, thereby to close said upper end except when said opening is in registration with said upper end, and further comprising a closure member adjacent said disc at a position opposite to said upper end of the pellet dispensing tube for closing the upper end when said opening is in registration with the upper end.

5. The apparatus of claim 3 wherein said housing is of a generally cylindrical shape, and said disc substantially covers said bottom wall.

6. The apparatus of claim 1 wherein said drive means includes a first shaft connected to said pellet conveying member for rotating said member, a second shaft operatively connected to said power source for rotation in one direction when the power source is actuated, and a slip clutch interconnecting said first and second shafts for rotation in unison, said slip cluth including means for rotating said first shaft to a limited extent in a reverse direction in response to resistance of said first shaft to rotate with said second shaft.

7. The apparatus of claim 6 wherein said slip clutch includes means for supporting a pair of spring plates on one of said shafts, the other shaft having a linear sided portion adapted for insertion between said spring plates for rotation therewith, said linear sided portion adapted to spread said spring plates apart in response to relative rotation between said first and second shafts.

8. The apparatus of claim 1 in combination with a water well having a water delivery pipe and means for providing water flow from said well through said water delivery tube, said control means being responsive to fluid flow through said pipe.

9. The combination of claim 8 wherein said control means comprises a baffle, hinge means for pivotally supporting said baffle interiorly of said pipe whereby said baffle is pivotally moved to a first position in response to an absence of flow through said pipe and to a second position in response to water flow through said pipe, a mercury switch carried on the baffle and electrically connected to said motor for stopping the motor when the baffle is in said first position and actuating the motor when the baffle is in said second position.

10. The apparatus of claim 1 wherein said power source includes an output shaft which is rotated when the power source is actuated, said drive means including a drive shaft, means for connecting said drive shaft to said output shaft for rotation through a selected angle in one direction in response to each revolution of said output shaft, and means for adjustably setting said selected angle for the drive shaft, said pellet conveying member operatively connected to said drive shaft for rotation therewith.

11. The apparatus of claim 10 wherein said drive means includes a support member for supporting said power source relative to said housing, said means for connecting the drive shaft and output shaft including, an eccentric cam on said output shaft, a pivot arm pivotally mounted on said support member, said pivot arm engageable with said eccentric cam for pivotal movement in response to rotation of said cam, a lever arm, first one-way bearing means supporting said lever arm on said drive shaft for rotation of the drive shaft in response to pivotal movement of the lever arm in one direction only, means interconnecting said pivot arm and lever arm for pivotal movement in unison, means biasing said bever arm to pivot in an opposite direction thereby biasing said pivot arm toward said eccentric cam.

12. The apparatus of claim 11 wherein said drive means includes second one-way bearing means for supporting said drive shaft relative to said housing, said bearing adapted to prevent rotation of said drive shaft in said opposite direction.

13. The apparatus of claim 11 wherein said means for adjustably setting said selected angle includes stop means for limiting movement of the pivot arm toward said eccentric cam.

14. The apparatus of claim 1 including means for regulating the temperature within said pellet storage chamber.

15. The apparatus of claim 1 including means for indicating that the level of pellets within said pellet chamber is below a predetermined level.

16. A chemical pellet dispensing device for a well equipped with means for providing fluid flow from the well, comprising:

a housing having an upwardly inclined bottom wall and a sidewall defining a pellet chamber, a pellet dispensing tube having a lower end adapted for communication with said well and an upper end connected to said bottom wall for communication with said pellet chamber, divider wall means secured to the housing and spaced from said bottom wall, said divider wall means having a wall opening for the passage of pellets past said divider wall means and toward said bottom wall, the top of said wall opening being disposed below said upper end of the pellet dispensing tube whereby the level of pellets between said bottom wall and divider wall means is below said upper end of the pellet dispensing tube, a pellet conveying member movably supported within said pellet chamber adjacent the bottom wall, said member having at least one pellet receiving opening, and said member being movable between a first position wherein said pellet receiving opening is disposed below the top of said wall opening for receiving a pellet therein, and a second position wherein said pellet receiving opening is registered with said pellet dispensing tube for delivering a pellet thereto, a power source, drive means interconnecting said power source and said pellet conveying member for movement of said member between said first and second positions in response to actuation of said power source, and control means for actuating said power source.

17. The device of claim 16 including means for supporting said housing with the bottom wall and pellet conveying member inclined relative to a vertical plane whereby a pellet in said chamber is received into said pellet receiving opening by gravity, and delivered therefrom into said pellet dispensing tube by gravity.

18. The device of claim 16 wherein said control means is adapted to actuate said power source in response to fluid flow from the well.

19. In combination with a well including a fluid delivery pipe and means for intermittently providing fluid flow from the well through said fluid delivery pipe, a chemical pellet dispensing apparatus comprising, a housing having a side wall and bottom wall defining a pellet chamber, a pellet conveying member operatively supported for movement between a first position wherein said member is adapted to receive a pellet from said chamber and a second position wherein said member is adapted to deliver said pellet to the well, a power source, drive means interconnecting said power source and said pellet conveying member for movement of said member between said first and second positions in response to actuation of said power source, and control means operative to actuate said power source in response to fluid flow through said fluid delivery pipe and operative to shut off said power source in response to an absence of fluid flow through said fluid delivery pipe whereby the quantity of pellets dispensed into the well is dependent upon the volume of fluid removed from the well through the fluid delivery pipe.

20. A pellet storage and dispensing apparatus comprising, a housing having a side wall and bottom wall defining a pellet chamber, a pellet conveying member operatively supported for movement between a first position wherein said member is adapted to receive a pellet from said chamber and a second position wherein said member is adapted to dispense said pellet exteriorly of said chamber, a power source, drive means interconnecting said power source and said pellet conveying member for movement of said member in response to actuation of said power source, and control means for actuating said power source, said drive means including a first shaft connected to said pellet conveying member for rotating said member, a second shaft operatively connected to said power source for rotation in one direction when the power source is actuated, and slip clutch means interconnecting said first and second shafts for rotation in unison, said slip clutch means including means for rotating said first shaft to a limited extent in a reverse direction in response to resistance of said first shaft to rotate with said second shaft in said one direction thereby to relieve the cause of said resistance so that operation of the pellet conveying member may continue unhindered.

* * * * *